(12) United States Patent
Canard et al.

(10) Patent No.: US 10,122,530 B2
(45) Date of Patent: Nov. 6, 2018

(54) METHOD AND SYSTEM FOR DELEGATING CALCULATION OF A BILINEAR PAIRING VALUE TO A CALCULATION SERVER

(71) Applicant: ORANGE, Paris (FR)

(72) Inventors: Sébastien Canard, Caen (FR); Julien Devigne, Caen (FR); Olivier Sanders, Caen (FR)

(73) Assignee: ORANGE, Paris (FR)

( * ) Notice: Subject to any disclaimer, the term of this patent is extended or adjusted under 35 U.S.C. 154(b) by 112 days.

(21) Appl. No.: 14/897,361

(22) PCT Filed: Jun. 10, 2014

(86) PCT No.: PCT/FR2014/051400
§ 371 (c)(1),
(2) Date: Dec. 10, 2015

(87) PCT Pub. No.: WO2014/199071
PCT Pub. Date: Dec. 18, 2014

(65) Prior Publication Data
US 2016/0142206 A1 May 19, 2016

(30) Foreign Application Priority Data
Jun. 11, 2013 (FR) ..................... 13 55373

(51) Int. Cl.
*H04L 9/08* (2006.01)
*G06F 7/58* (2006.01)
*H04L 9/30* (2006.01)

(52) U.S. Cl.
CPC ............ *H04L 9/0869* (2013.01); *G06F 7/588* (2013.01); *H04L 9/3073* (2013.01); *H04L 2209/24* (2013.01); *H04L 2209/76* (2013.01)

(58) Field of Classification Search
CPC . H04L 9/0869; H04L 2209/24; H04L 9/3073; H04L 2209/76; G06F 7/588
See application file for complete search history.

(56) References Cited

U.S. PATENT DOCUMENTS

| | | | |
|---|---|---|---|
| 2005/0022102 A1* | 1/2005 | Gentry | H04L 9/3073 715/255 |
| 2006/0098824 A1* | 5/2006 | Mao | H04L 9/3073 380/282 |

(Continued)

FOREIGN PATENT DOCUMENTS

| | | | |
|---|---|---|---|
| WO | WO 2004047362 A1 * | 6/2004 | ............ G06F 21/33 |
| WO | WO 2005/125085 A2 | 12/2005 | |
| WO | WO 2005125085 A2 * | 12/2005 | ........... G06Q 20/341 |

OTHER PUBLICATIONS

Kang et al., "Efficient delegation of pairing computation.", 2005, pp. 1-7.*

(Continued)

*Primary Examiner* — Yonas A Bayou
(74) *Attorney, Agent, or Firm* — Knobbe, Martens, Olson & Bear, LLP (57) ABSTRACT

One embodiment relates to a method for enabling an entity to delegate calculation of a bilinear pairing value e(A,B) between two values A and B to a calculation server. The entity may select public elements P1 and P2 and secret elements S1 and S2, two of the elements from among P1, P2, S1, and S2 being selected to be equal to A and B, generate elements R1=vS1, R2=uS2, T1=uP1+S1, T2=vP2=S2, where $\underline{u}$ and $\underline{v}$ are random numbers, and transmit R1, R2, T1, and T2 to the calculation server. The server may calculate $(a1)^y = e(T1,T2)[e(R1,P2)e(P1,R2)]^{-1}$, and $(a2)^z = e(D1,D2)$, $\underline{y}$ and $\underline{z}$ designating two integers equal to 1 or to an integer $\underline{c}$, D1 and D2 designating two public elements from among A and B or from among R1 and R2 and transmit a1 and a2

(Continued)

to the entity. The entity may obtain the value e(A,B) from a1 or a2.

16 Claims, 2 Drawing Sheets

(56) References Cited

U.S. PATENT DOCUMENTS

| | | | | |
|---|---|---|---|---|
| 2007/0189513 A1* | 8/2007 | Brier | ............... | G06F 7/725 380/28 |
| 2008/0133926 A1* | 6/2008 | Gentry | ............... | H04L 9/3073 713/176 |
| 2008/0178005 A1* | 7/2008 | Gentry | ............... | H04L 9/3073 713/176 |
| 2008/0313465 A1* | 12/2008 | Gentry | ............... | H04L 9/3073 713/176 |
| 2014/0205087 A1* | 7/2014 | Sakumoto | ............... | H04L 9/3271 380/30 |

OTHER PUBLICATIONS

Chevallier-Mames et al., "Secure Delegation of Elliptic-Curve Pairing", 2005, pp. 24-35.*
Kang et al., "Efficient delegation of pairing computation.", 2005, pp. 1-7. (Year: 2005).*
Chevallier-Mames et al., "Secure Delegation of Elliptic-Curve Pairing", 2005, pp. 24-35. (Year: 2005).*
Avanzi, R. M., Doche, C., Lange, T., Nguyen, K., & Vercauteren, F. 2006. Implementation of pairings. In H. Cohen & G. Frey (Eds.), *Handbook of Elliptic and Hyperelliptic Curve Cryptography*, Chap. 16, pp. 389-404. Boca Raton: Chapman & Hall/CRC.
Boneh, et al. 2001. Identity-based encryption from the Weil pairing. Advances in Cryptology—CRYPTO 2001, 21$^{st}$ Annual International Cryptology Conference, Santa Barbara, California, USA, Aug. 19-23, 2001, Proceedings, Springer, Lecture Notes in Computer Science, vol. 2139, pp. 213-229.
Boneh, et al. 2001. Short signatures from the Weil pairing. ASIACRYPT 2001, Springer-Verlag, pp. 516-534.
Chevallier-Mames et al. 2005. Secure delegation of elliptic-curve pairing. IACR Cryptology ePrint Archive 2005, 11 pages.
Chevallier-Mames, et al. Apr. 14, 2010. Secure Delegation of Elliptic-Curve Pairing. *Smart Card Research and Advanced Application*. Berlin: Springer Berlin Heidelberg, pp. 24-35.
Kang, et al. Aug. 11, 2005, Efficient Delegation of Pairing Computation. *International Association for Cryptologic Research*, vol. 20050811:071923, pp. 1-7.
Tsai, Hong-Bin. Aug. 29, 2005. Secure Delegation of Pairing Computation. URL:http://fractal.ee.ntu.edu.tw/"hbtsai/Secure_Delegation_of_Pairing_Computation.pdf. Retrieved from the Internet Mar. 25, 2014, 26 pages.
International Search Report dated Nov. 18, 2014 for International Application No. PCT/FR2014/051400 filed Jun. 10, 2014, 7 pages.

* cited by examiner

METHOD AND SYSTEM FOR DELEGATING CALCULATION OF A BILINEAR PAIRING VALUE TO A CALCULATION SERVER

RELATED APPLICATIONS

This application is the U.S. National Phase of Application No. PCT/FR2014/051400 entitled "METHOD AND SYSTEM FOR DELEGATING A CALCULATION OF A BILINEAR COUPLING VALUE TO A CALCULATION SERVER" filed Jun. 10, 2014, which designated the United States, and which claims the benefit of French Application No. 1355373 filed Jun. 11, 2013.

BACKGROUND OF THE INVENTION

The invention relates to the general field of cryptography and of protecting digital data.

The invention relates more particularly to a method enabling a so-called "trusted" entity to securely delegate calculation of a value of a bilinear pairing or mapping to a calculation server.

The invention thus applies in preferred but non-limiting manner to numerous cryptographic protocols (in particular public key protocols, such as cryptographic protocols for digitally signing messages) that make use of complex mathematical tools known as bilinear pairings.

Numerous cryptographic protocols have recently come into use in the field of telecommunications, and in particular in mobile communications, in order to enable various actors in that field (e.g. operators, service providers, etc.) to provide their clients with new functions and/or services, while guaranteeing protection and respect for their private lives. Those protocols often require the use of mathematical techniques that are complex, such as bilinear pairings.

It should be recalled that a bilinear pairing, written $\underline{e}$, is a mapping (or map) defined on a set $G1 \times G2$ to a set $GT$ contained in a group $G$, where $G1$, $G2$, and $GT$ generally designate cyclic groups of order $\underline{p}$, where $\underline{p}$ is a prime number. This mapping $\underline{e}$ satisfies the following properties:
(1) Bilinearity:

$$\forall X1 \in G1, \forall X2 \in G2, \forall (a,b) \in Z_p, e(aX1, bX2) = e(X1, X2)^{ab}$$

where $Z_p$ designates the set of relative integers less than $\underline{p}$.
(2) Non-degenerate: for $X1 \neq 1_{G1}$ and $X2 \neq 1_{G2}$, $e(X1, X2) \neq 1_{GT}$ where $1_{G1}$, $1_{G2}$ and $1_{GT}$ designate respectively the unities of the sets $G1$, $G2$, and $GT$.
(3) Calculable: there exists an efficient algorithm for calculating $e(X1, X2)$, $\forall X1 \in G1, \forall X2 \in G2$.

Although such bilinear pairings have been known for a long time, their applications to the field of cryptography is relatively recent. Furthermore, implementing these tools requires a large amount of computation power, which makes them difficult to use in practice by low power entities such as, for example: a smart card such as a mobile identity card or subscriber identity module (SIM) card.

A conventional solution for remedying that drawback consists in delegating the calculation of bilinear pairings to a more powerful entity, which is referred to in this description in general manner as a calculation server. Thus, for example, for a SIM card, the calculation server may be the telephone in which the SIM card is inserted.

It should be observed that delegating the calculation of bilinear pairings may be envisaged in other circumstances. Thus, for example, a computer may also find it advantageous to delegate certain cryptographic calculations to a remote computer server in order to release time for other processes (whether cryptographic or otherwise).

Although the calculation server is capable of carrying out the bilinear pairing calculation that has been delegated thereto in efficient manner, it does not necessarily provide the same guarantees in terms of security as the entity that delegated the calculation. By way of illustration, in the above example, although the SIM card of a mobile telephone constitutes a secure element, that is not true of the telephone that receives it, which may be corrupted by malicious applications such as viruses.

Consequently, an important problem that arises when a so-called trusted entity delegates the calculation of a bilinear pairing to a calculation server, is the verifiability of the bilinear pairing value supplied by the calculation server. In other words, it is important for the trusted entity to be capable of being sure that the bilinear pairing value that has been calculated and supplied by the calculation server is correct. It should be observed that a trusted entity that accepts and uses a bilinear pairing value as evaluated by a remote server in a cryptographic protocol, but without taking care to verify that value, exposes itself to severe security problems that may go well beyond mere denial of service: by way of example, accepting an invalid digital signature issued by a malicious entity might lead to sensitive data being transmitted to that entity.

In an article entitled "Secure delegation of elliptic-curve pairing", IACR Cryptology ePrint Archive 2005, Chevallier-Mames et al. propose a mechanism enabling a trusted entity to delegate a bilinear pairing calculation to a calculation server that enables the bilinear pairings that are evaluated by the calculation server to be verified by the trusted entity. Nevertheless, that mechanism is not very efficient in terms of resources: seven exponentiations in the group GT are required to guarantee such verifiability (where exponentiations are the operations that are most expensive in terms of complexity), such that the delegation mechanism proposed by Chevallier-Mames would appear to be difficult to use in practice.

There therefore exists a need for a secure mechanism for delegating a bilinear pairing value to a calculation server that enables the value returned by that server to be verified provided an efficient and reasonable (i.e. small) implementation in terms of complexity.

OBJECT AND SUMMARY OF THE INVENTION

The invention satisfies this need in particular by providing a delegation method enabling an entity to delegate calculation of a bilinear pairing value $e(A,B)$ between two values A and B to a calculation server, the delegation method comprising:
  a selection step of the entity selecting two public elements P1 and P2 and two elements S1 and S2 that the entity keeps secret, two of the elements P1, P2, S1, and S2 being selected from among the values A and B respectively;
  a generation step of the entity generating four elements:

$R1 = vS1$ $R2 = uS2$ $T1 = uP1 + S1$, and $T2 = vP2 + S2$ where $\underline{u}$ and $\underline{v}$ designate random numbers;

a transmission step of the entity transmitting the elements R1, R2, T1, and T2 to the calculation server;

a calculation step of the calculation server calculating two values a1 and a2 satisfying:

$$(a1)^y = e(T1,T2)[e(R1,P2)e(P1,R2)]^{-1}, \text{ and}$$

$$(a2)^z = e(D1,D2)$$

$y$ and $z$ designating two predetermined integers, each of the integers being equal to 1 or to a predetermined integer $c$, and D1 and D2 designating two public elements selected from among the values A and B or the elements R1 and R2;

a transmission step of the calculation server transmitting the values a1 and a2 to the entity; and an obtaining step of the entity obtaining the pairing value e(A,B) from the value a1 or from the value a2.

It should be observed that the term "delegating the calculation of the bilinear pairing value to a calculation server", as used in the invention does not mean only that the server calculates the value e(A,B). The purpose of such delegation is specifically for the calculation server to perform calculations that are more expensive in terms of resources and that lead to the bilinear pairing value. In other words, delegation in the meaning of the invention also includes the situation in which the calculation server calculates and supplies the entity with a value that is distinct from the bilinear pairing value e(A,B), but from which it is easy for the entity to extract the bilinear pairing value e(A,B) while performing operations that are relatively simple (e.g. multiplication).

By an appropriate choice of values to be exchanged between the entity and the calculation server (i.e. firstly R1, R2, T1, and T2, and secondly a1 and a2), the invention provides a solution enabling the entity to delegate a bilinear pairing calculation in a manner that is efficient and verifiable. The entity can use the values a1 and a2 in very simple manner by putting them into predetermined equalities relating these values to elements that are known to the entity, firstly in order to extract or deduce the looked-for bilinear pairing value e(A,B), and secondly in order to verify that the extracted value coming from the calculated server is correct.

The solution proposed by the invention presents the advantage of requiring exponentiations in the set in which the bilinear pairing e(A,B) takes its values that are very few in comparison with the prior art as described by Chevallier-Mames et al. in particular (one or two exponentiations depending on the values $y$ and $z$ compared with seven or ten depending on the implementation envisaged). The fact that the entity relies on secret elements for delegating the calculation to the calculation server makes it possible to ensure that the calculation performed by the calculation server is verifiable. Furthermore, the construction of the elements R1, R2, T1, and T2 that are transmitted by the entity to the calculation server requires fewer operations than in the protocols of the prior art, thus making it possible to further reduce the complexity of implementing the invention.

It should be observed that the invention relies on several occasions on calculating elements of the type $x^c$ equal to a certain bilinear pairing or to a product of bilinear pairings (e.g. such as $(a1)^y$ and $(a2)^z$). Nevertheless, it is important to remember that in practice, given the calculation algorithms in existence, such as in particular the known Tate-Lichtenbaum algorithm described in the document entitled "Handbook of elliptic and hyperliptic curve cryptography" by R. M. Avanzi et al., obtaining such values is much less expensive than calculating a bilinear pairing. Consequently, by using such values instead of bilinear pairings, the invention reduces the number of operations required in order to achieve secure and efficient delegation of the calculation of the bilinear pairing e(A,B).

In accordance with the invention, each integer $y$ and $z$ may be selected to be equal to 1 or to a predetermined integer $c$.

Thus, for example, the predetermined integers $y$ and $z$ may advantageously be selected so as to satisfy:

$$z = c + 1 - y$$

In another example, each integer $y$ and $z$ may be selected independently of each other to be equal to 1 or to a predetermined integer $c$.

In a particular implementation, the delegation further comprises a verification step of verifying the validity of the extracted pairing value e(A,B) by using an equality relating the values a1 and a2, the random numbers $u$ and $v$, and an element S that is kept secret by the entity. By way of example, the element S may be selected such that $S^y = e(S1, S2)$ or $S = e(uP1, vP2)$. This choice makes it easier to verify the validity of the bilinear pairing value calculated by the calculation server.

The invention is applied advantageously to various configurations of values A and B, i.e. depending on whether or not they are public or secret.

Thus, in a particular implementation, the values A and B are public values and:

$$P1 = A, \ P2 = B$$

and it is selected that:

$$y = c, \ z = 1 \text{ or } y = z = 1$$

In another implementation, the values A and B are on the contrary, kept secret by the entity and:

$$S1 = A, \ S2 = B$$

and it is selected that:

$$y = 1, \ z = c \text{ or } y = z = 1$$

This implementation provides a solution that makes it possible in particular to ensure that the calculation of the bilinear pairing value e(A,B) by the calculation server is verifiable efficiently and also that it is confidential. Specifically in this implementation, the entity receives the bilinear pairing value masked by a secret S that is known only to the entity.

In a particular implementation, the element S and the random numbers $u$ and $v$ are independent of the values A and B.

This implementation makes it possible for these elements to be precalculated during a step that constitutes a preliminary to executing the protocol that requires the bilinear pairing value to be calculated, e.g. that is performed while the entity is at rest (i.e. while it is not participating in the cryptographic protocol requiring the bilinear pairing, or more generally not participating in other processes that involve its active participation).

The invention thus proposes a delegation mechanism, and for this purpose it relies on two main devices, namely the entity that delegates the calculation of the bilinear pairing value and the calculation server to which the calculation is imparted. Thus, the invention also provides these two devices and the methods that they perform.

In other words, in another aspect, the invention also provides an obtaining method enabling an entity to obtain a bilinear pairing value e(A,B) between two values A and B from a value calculated by a calculation server, the obtaining method comprising:
- a selection step of selecting two public elements P1 and P2 and two elements S1 and S2 that the entity keeps secret, two of the elements P1, P2, S1, and S2 being selected from among the values A and B respectively;
- a generation step of generating four elements:

$$R1 = vS1$$

$$R2 = uS2$$

$$T1 = uP1 + S1, \text{ and}$$

$$T2 = vP2 + S2$$

where $\underline{u}$ and $\underline{v}$ designate random numbers;
- a transmission step of transmitting the elements R1, R2, T1, and T2 to the calculation server;
- a reception step of receiving two values a1 and a2 calculated by the calculation server and satisfying:

$$(a1)^y = e(T1,T2)[e(R1,P2)e(P1,R2)]^{-1}, \text{ and}$$

$$(a2)^z = e(D1,D2)$$

$\underline{y}$ and $\underline{z}$ designating two predetermined integers, each of the integers being equal to 1 or to a predetermined integer $\underline{c}$, and D1 and D2 designating two public elements selected from among the values A and B or the elements R1 and R2; and
- an obtaining step of obtaining the pairing value e(A,B) from the value a1 or from the value a2.

Correspondingly, the invention also provides an entity suitable for obtaining a bilinear pairing value e(A,B) between two values A and B from a value calculated by a calculation server, the entity comprising:
- a selection module for selecting two public elements P1 and P2 and two elements S1 and S2 that the entity keeps secret, two of the elements P1, P2, S1, and S2 being selected from among the values A and B respectively;
- a generation module for generating four elements:

$$R1 = vS1$$

$$R2 = uS2$$

$$T1 = uP1 + S1, \text{ and}$$

$$T2 = vP2 + S2$$

where $\underline{u}$ and $\underline{v}$ designate random numbers;
- a transmission module for transmitting the elements R1, R2, T1, and T2 to the calculation server;
- a reception module for receiving two values a1 and a2 calculated by the calculation server and satisfying:

$$(a1)^y = e(T1,T2)[e(R1,P2)e(P1,R2)]^{-1}, \text{ and}$$

$$(a2)^z = e(D1,D2)$$

$\underline{y}$ and $\underline{z}$ designating two predetermined integers, each of the integers being equal to 1 or to a predetermined integer $\underline{c}$, and D1 and D2 designating two public elements selected from among the values A and B or the elements R1 and R2; and
- an obtaining module for obtaining the pairing value e(A,B) from the value a1 or from the value a2.

In yet another aspect, the invention provides a transmission method for transmitting values calculated by a calculation server to an entity so as to enable the entity to obtain a bilinear pairing value e(A,B) between two values A and B, the transmission method comprising:
- a reception step of receiving from the entity four elements R1, R2, T1, and T2;
- a calculation step of calculating two values a1 and a2 satisfying:

$$(a1)^Y = e(T1,T2)[e(R1,P2)e(P1,R2)]^{-1}, \text{ and}$$

$$(a2)^z = e(D1,D2)$$

P1 and P2 designating two public elements, $\underline{y}$ and $\underline{z}$ designating two predetermined integers, each of the integers being equal to 1 or to a predetermined integer $\underline{c}$, and D1 and D2 designating two public elements selected from among the values A and B or from among the elements R1 and R2; and
- a transmission step of transmitting the values a1 to a2 to the entity.

Correspondingly, the invention also provides a calculation server comprising:
- a reception module for receiving from an entity four elements R1, R2, T1, and T2;
- a calculation module for calculating two values a1 and a2 satisfying:

$$(a1)^y = e(T1,T2)[e(R1,P2)e(P1,R2)]^{-1}, \text{ and}$$

$$(a2)^z = e(D1,D2)$$

$\underline{e}$ designating a bilinear pairing, P1 and P2 designating two public elements, $\underline{y}$ and $\underline{z}$ designating two predetermined integers, each of the integers being equal to 1 or to a predetermined integer $\underline{c}$, and D1 and D2 designating two public elements selected from among the values A and B or from among the elements R1 and R2; and
- a transmission module for transmitting the values a1 to a2 to the entity.

In another aspect, the invention also provides a system comprising:
- an entity of the invention; and
- a calculation server of the invention;

said entity being suitable for delegating to said calculation server a calculation of a bilinear pairing value e(A,B) between two values A and B.

The transmission method, the obtaining method, the entity, the calculation server, and the system of the invention benefit from the same advantages as the delegation method.

In other embodiments and implementations, it is also possible to envisage that the delegation method, the obtaining method, the transmission method, the entity, the calculation server, and the system of the invention present in combination all or some of the above-mentioned characteristics.

In a particular implementation, the various steps of the obtaining method and/or of the transmission method are determined by computer program instructions or are implemented on a silicon chip that includes transistors adapted to constitute logic gates in a non-programmable wired logic circuit.

Consequently, the invention also provides a computer program on a data medium, the program being suitable for being performed in an entity, or more generally in a computer, the program including instructions adapted to perform steps of an obtaining method as described above.

The invention also provides a computer program on a data medium, the program being suitable for being performed in a calculation server or more generally in a computer, the program including instructions adapted to perform steps of a transmission method as described above.

These programs may use any programming language, and be in the form of source code, object code, or code intermediate between source code and object code, such as in a partially compiled form, or in any other desirable form.

The invention also provides a computer readable data medium including instructions of a computer program as mentioned above.

The data medium may be any entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings, which show implementations having no limiting character. In the figures.

DETAILED DESCRIPTION OF THE INVENTION

Figure 1:
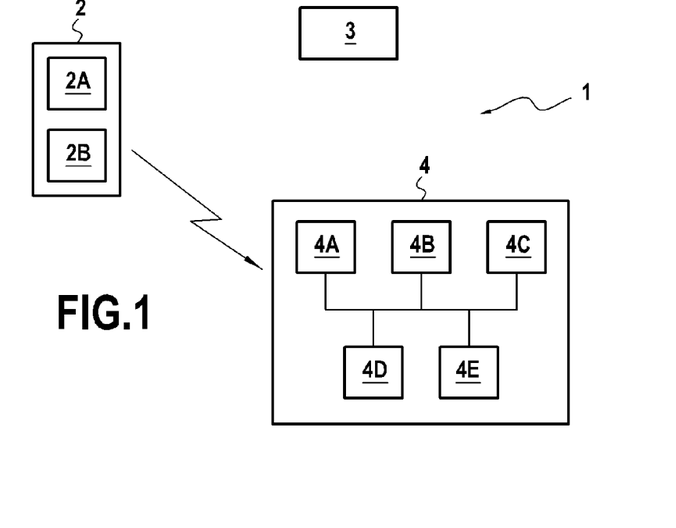
FIG. 1 is a diagram of a system, an entity, and a calculation server in accordance with the invention in respective particular embodiments.

FIG. 1 shows a system 1 in accordance with a particular embodiment of the invention, in its environment.

The system 1 comprises:

a so-called "trusted" entity 2 in accordance with the invention, involved in a public key cryptographic protocol with another entity 3 referred to as a "signature" entity. By way of example, the public key cryptographic protocol is a protocol for authenticating the entity 3 with the entity 2 on the basis of the entity 2 calculating a bilinear pairing. By way of example, such a protocol is the signature protocol proposed by Boneh, Lynn, and Shacham, described in the article "Short signature from the Weil pairing", at the Asiacrypt 2001 conference; and a calculation server 4 in accordance with the invention to which the trusted entity 2 delegates calculation of the bilinear pairing.

No limitation is associated with the particular nature of the entities 2 and 3 and of the calculation server 4, the only constraint proper being that the calculation server 4 needs to have the necessary resources for evaluating a bilinear pairing.

Thus, by way of example, the entity 2 may be a SIM card seeking to authenticate an entity 3 of a telecommunications network seeking to access data of the entity 2 or to modify such data, and for this purpose delegating the calculation of the bilinear pairing required in the authentication to a telephone 4 in which the card is inserted. In another example, the entity 2 may be a computer seeking to authenticate a service provider 3 by calling on a computer server 4 to perform the bilinear pairing calculation that it needs during this authentication.

Likewise, no limitation is associated with the cryptographic protocol in which the trusted entity 2 is involved in association with the signature entity 3 and that requires one or more bilinear pairings to be calculated.

Furthermore, in the presently-described example, it is assumed that it is the entity 2 that delegates calculating the bilinear pairing to the calculation server 4. In a variant, and where appropriate, the entity 3 could equally well delegate such a calculation (and be an entity in accordance with the invention) in particular if it does not have sufficient computation power to carry out the calculation. The invention thus applies to various delegation configurations (the entity 2 delegates a bilinear pairing calculation to the calculation server 4, or the entity 3 delegates such a calculation to the calculation server 4, or indeed both of the entities 2 and 3 delegate such a calculation to the calculation server 4, in accordance with the invention).

In the presently-described embodiment, the entity 2 incorporates a silicon chip 2A and communication means 2B for communicating with the signature entity 3 and the calculation server 4.

The silicon chip 2A includes transistors suitable for constituting logic gates of non-programmable wired logic for executing steps of a method of obtaining a bilinear pairing value in accordance with the invention. These steps are described below with reference to FIGS. 2 to 4, in various implementations.

This wired logic defines in corresponding manner functional modules of the entity 2 that are suitable for performing the steps of the obtaining method of the invention for obtaining a bilinear pairing value, and in particular a module for selecting both public and secret elements, a module for generating elements R1, R2, T1, and T2, as described below, a communication module for co-operating with the communication means 2B in order to communicate with the calculation server 4 and suitable for transmitting the elements R1, R2, T1, and T2 generated by the entity and/or for receiving values calculated by the server, an obtaining module for obtaining the desired bilinear pairing value from values calculated by the server 4, and in the presently-described embodiment, a module for verifying the bilinear pairing value that is obtained.

The silicon chip 2A constitutes a data medium in accordance with the invention.

In another embodiment of the invention, the entity 2 has the hardware architecture of a computer, and in particular it has a processor, a read only memory, a random access memory (RAM), a non-volatile memory, and communication means for communicating with the signature entity 3 and with the calculation server 4. The ROM of the entity 2 constitutes a data medium in accordance with the invention that is readable by the processor and that stores a computer program in accordance with the invention that includes instructions for executing steps of the obtaining method of the invention for obtaining a bilinear pairing value. In corresponding manner, the computer programs defines the above-described functional modules of the entity 2, which are suitable for performing the steps of the obtaining method.

In the presently-described embodiment, the calculation server 4 has the hardware architecture of a computer. It comprises in particular a processor 4A, a ROM 4B, a RAM 4C, a non-volatile memory 4D, and communication means 4E for communicating with the entity 2.

The ROM 4B of the calculation server constitutes a data medium in accordance with the invention that is readable by the processor 4A and that stores a computer program in accordance with the invention that includes instructions for executing steps of a transmission method of the invention as described below with reference to FIGS. 2 to 4, in various implementations. In corresponding manner, the computer program defines functional modules of the calculation server suitable for performing the steps of the transmission method of the invention, and in particular a reception module for receiving elements coming from the entity 2, a calculation module for calculating particular values (pairing values or intermediate values) from these elements, and a transmission module for transmitting the values as calculated in this way to the entity 2.

Figure 2:
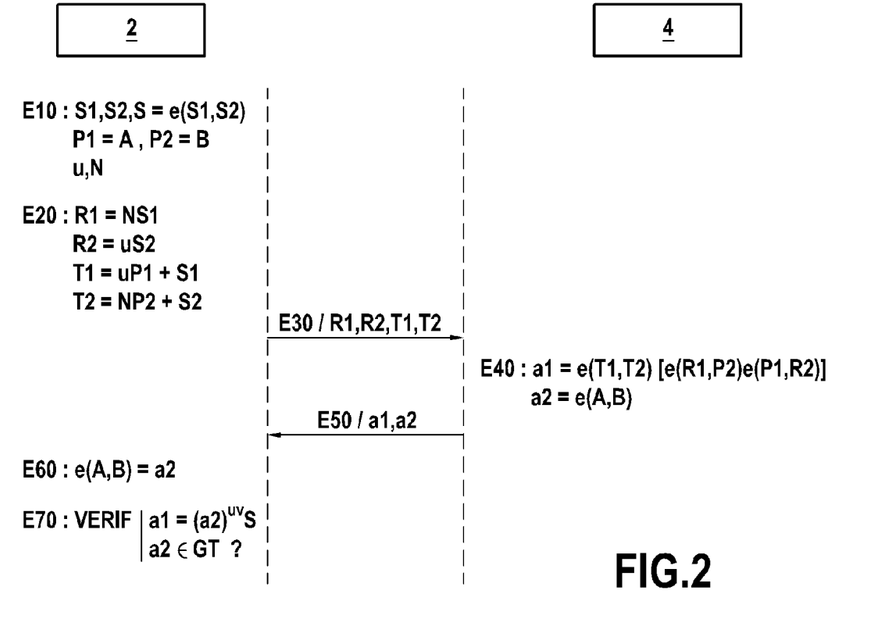
FIGS. 2, 3, and 4 show three distinct implementations respectively of the delegation method, and of the corresponding obtaining and transmission methods of the invention.
Figure 3:
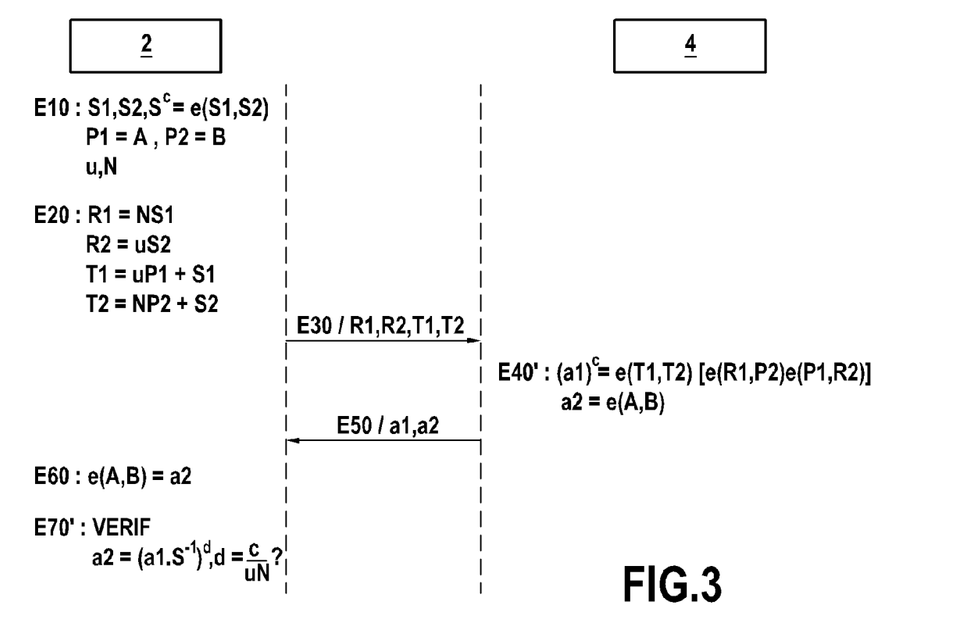
Figure 4:
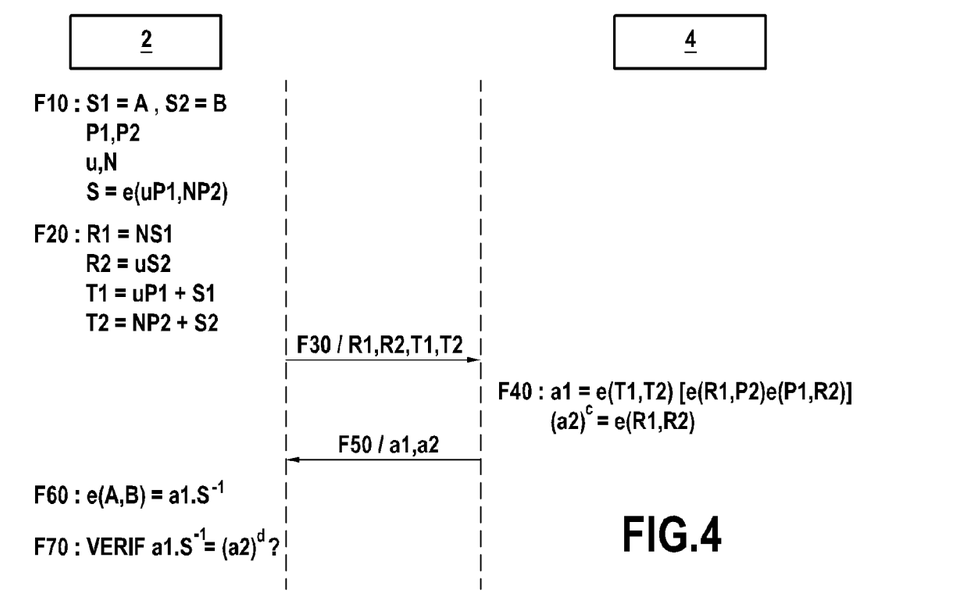

With reference to FIGS. 2 to 4, there follows a description of the main steps of the method implemented by the entity 2 for obtaining a bilinear pairing value, and also the main steps of the transmission method as they are performed by the calculation server 4 when the system 1 performs a method of the entity 2 delegating the calculation of this bilinear pairing value to the calculation server 4 in various implementations.

In the description below, the letter "e" designates the bilinear pairing or mapping for which the entity 2 seeks to delegate calculation to the calculation server 4, and the letters "A" and "B" designate the values that are applied to this bilinear pairing. The values that result from this application is written e(A,B).

In the presently-envisaged example, the bilinear pairing $\underline{e}$ is a mapping defined on a set G1×G2 to a set GT contained in a group G, where G designates the smallest finite body containing GT. G1 and G2 designate (additive) cyclic groups of order $\underline{p}$, and GT designates a cyclic (multiplicative) group of order $\underline{p}$, where $\underline{p}$ is a prime number. In the description below, the letter "c" designates the number of elements of the group G divided by the number of elements of GT. The mapping $\underline{e}$ satisfies the above-mentioned bilinear, non-degenerate, and calculable properties.

In a variant, it is possible to envisage groups G1, G2, and GT that are non-cyclic and of order $\underline{p}$.

It should be observed that no limit is associated with the type, i.e. with the form properly speaking of the bilinear pairing $\underline{e}$ under consideration. The invention thus applies equally well to any type of bilinear pairing, such as in particular a Tate pairing, as known to the person skilled in the art.

The implementations shown in FIGS. 2 and 3 are particularly applicable when the values A and B of the groups G1 and G2 respectively for which the entity 2 seeks to obtain a bilinear pairing value are public. The term "public" is used herein to mean that these values are known to the calculation server 4 (and possibly to other entities), in contrast to values that are kept secret by the entity 2, in particular with respect to the calculation server 4. These implementations make it possible advantageously to delegate the calculation of the value e(A,B) in secure manner and to ensure that this calculation is verifiable using no more than two exponentiations in the group GT.

In the first implementation shown in FIG. 2, the entity 2 selects two elements S1 and S2 respectively from the groups G1 and G2, and it keeps these elements secret, in particular from the calculation server 4 (step E10). It is also assumed that the entity 2 knows a third secret element S defined as follows:

$$S=e(S1,S2)$$

This secret value S in this example is precalculated for various predetermined values of S1 and S2 (these belong to the finite groups G1 and G2), and is downloaded and stored in the silicon chip 2A of the entity 2 when it is created, so as to be available for use by the entity 2 without requiring it to perform any pairing calculation.

Nevertheless, the invention is not limited to a static configuration of the entity 2 with secret values S that are precalculated before it was created. It is possible to envisage that new secret values S=e(S1,S2) are downloaded by the entity 2 for other values of S1 and S2 at later moments (i.e. after its creation) via conventional means, it being possible for these secret values to be calculated by entities that are distinct from the entity 2 (i.e. typically by more powerful calculation servers), e.g. using the delegation method of the invention as described below with reference to the third implementation.

The entity 2 also selects two public elements P1 and P2 belonging respectively to the groups G1 and G2 and that are already known by or going to be known by the calculation server 4 (step E10). Since the values A and B are public, the entity 2 selects P1=A and P2=B.

The entity 2 selects two random numbers written $\underline{u}$ and $\underline{v}$. These random numbers are integers selected from the set of relative integers less than $\underline{p}$.

Thereafter, it generates four elements written R1, R2, T1, and T2 from the elements S1, S2, P1, P2, $\underline{u}$, and $\underline{v}$ that satisfy (step E20):

$$R1=vS1$$

$$R2=uS2$$

$$T1=uP1+S1, \text{ and}$$

$$T2=vP2+S2$$

R1 and T1 being elements of G1, and R2 and T2 being elements of G2.

By way of example, these elements are generated from an elliptic curve in conventional manner. In a variant, they may be calculated by the entity 2.

These four elements R1, R2, T1, and T2 are then transmitted by the entity 2 to the calculation server 4 via its communication means (step E30).

On receiving these elements, the calculation server 4 calculates (step E40) two pairing values a1 and a2 that satisfy:

$$(a1)=e(T1,T2)[e(R1,P2)e(P1,R2)]^{-1}, \text{ and}$$

$$(a2)=e(A,B)$$

Various algorithms enabling these bilinear pairings to be calculated efficiently and suitable for being performed by the calculation server 4 are described, in particular in the document entitled "Handbook of elliptic and hyperelliptic curve cryptography" co-written by Roberto M. Avanzi, Henri Cohen, Christophe Doche, Gerhard Frey, Tanja Lange, Kim Nguyen, and Frederik Vercauteren, in Chapter 16. By way of example, the calculation server 4 may use a Tate-Lichtenbaum algorithm when the pairing e is a Tate pairing as is commonly used in cryptography.

The calculation server 4 transmits the values a1 and a2 as calculated in this way to the entity 2 (step E50).

The entity 2 obtains the desired bilinear pairing value e(A,B) directly from the value a2 (step E60).

Then, in the presently-described implementation, the entity 2 verifies the validity of this value e(A,B) as supplied by the calculation server 4 (step E70).

For this purpose, it begins by ensuring that:

$$a1 = (a2)^{uv} \cdot S \qquad (\text{eq1})$$

This equality stems advantageously from a suitable choice of elements R1, R2, T1, T2 and of values a1 and a2, and also from the properties of the bilinear pairing e. Verifying this equality requires few resources since it relies on one exponentiation and one multiplication.

Thereafter, it ensures that the value a2 of the bilinear pairing as supplied by the calculation server 4 is indeed an element of the set GT. This verification does not present any difficulty in itself for the person skilled in the art and is not described in greater detail herein. It may be performed in particular by an exponentiation performed in the group GT.

If both verifications are positive, then the entity 2 is convinced that the bilinear pairing value e(A,B) supplied by the calculation server 4 is correct. Otherwise, it rejects this result.

It can thus be seen that in this implementation, only two exponentiations in the group GT are required to be sure that the bilinear pairing value e(A,B) as calculated and transmitted by the calculation server 4 is valid: a first exponentiation is required to verify the equality (eq1), and a second exponentiation is required to verify that the value a2 does indeed belong to the set GT.

Furthermore, it should be observed that the values R1 and R2 generated by the entity 2 may advantageously be precalculated and stored in a memory of the entity 2 during a preliminary stage, since they do not depend on the values A and B. As a result, during execution proper of the cryptographic protocol requiring the bilinear pairing value e(A,B) to be calculated, the entity 2 needs to calculate "live" only a scalar multiplication and an addition in G1, a scalar multiplication and an addition in G2, and two exponentiations in GT.

With reference to FIG. 3, there follows a description of a second implementation of the invention. For simplification purposes, the steps of the second implementation that are identical to steps of the first implementation are numbered in similar manner in the description below.

The second implementation takes advantage of the structure of the algorithm performed by the calculation server 4 in order to evaluate the pairing values a1 and a2.

In known manner, numerous algorithms used for evaluating bilinear pairing values, and in particular the above-mentioned Tate-Lichtenbaum algorithm, take place in two stages, with the last stage consisting in exponentiating to the power c an intermediate value obtained from the first stage, where, it should be recalled, c designates the number of elements in the group G divided by the number of elements in the group GT. This last stage is often the stage in the calculation of a bilinear pairing that is the most expensive in terms of resources.

Thus, in order to further reduce the number of operations needed for delegation, the second implementation proposes transmitting to the entity 2, not the pairing value e(T1,T2)[e(R1,P2)e(P1,R2)]$^{-1}$, but the intermediate value as calculated and obtained by the calculation server 4 immediately prior to the exponentiation that obtains the value of this pairing, in other words a value a1 such that:

$$(a1)^c = e(T1,T2)[e(R1,P2)e(P1,R2)]^{-1}$$

More precisely, with reference to FIG. 3, and as described for step E10 in the first implementation, the entity 2 selects two elements S1 and S2 respectively from the groups G1 and G2, and it keeps these elements secret from the calculation server 4, while also selecting two public elements that are taken respectively from the groups G1 and G2 (step E10'). The public elements selected by the entity 2 are P1=A and P2=B.

The entity 2 also knows a third secret element S (which may be precalculated and downloaded in the entity 2, as described above), such that:

$$S^c = e(S1,S2)$$

The entity 2 likewise selects two random numbers u and v from the set of relative integers less than p.

Thereafter, it generates four elements written R1, R2, T1, and T2 from the elements S1, S2, P1, P2, u, and v (e.g. from points of elliptic curve(s)) that satisfy (step E20):

$$R1 = vS1$$

$$R2 = uS2$$

$$T1 = uP1 + S1, \text{ and}$$

$$T2 = vP2 + S2$$

R1 and T1 being elements of G1, and R2 and T2 being elements of G2.

These four elements R1, R2, T1, and T2 are then transmitted by the entity 2 to the calculation server 4 via its communication means (step E30).

In the second implementation, on receiving these elements, the calculation server 4 calculates (step E40') one pairing value a2 together with an intermediate value a1, such that:

$$(a1)^c = e(T1,T2)[e(R1,P2)e(P1,R2)]^{-1}, \text{ and}$$

$$(a2) = e(A,B)$$

As mentioned above, it is possible for this purpose to use known algorithms for calculating bilinear pairings, such as in particular the Tate-Lichtenbaum algorithm when the pairing e is a Tate pairing.

The calculation server 4 transmits the values a1 and a2 as calculated in this way to the entity 2 (step E50).

As in the first embodiment, the entity 2 obtains the desired bilinear pairing value e(A,B) from the value a2 (step E60).

Thereafter, the entity 2 verifies the validity of this value e(A,B) supplied by the calculation server 4 (step E70').

For this purpose, it ensures that:

$$a2 = (a1 \cdot S^{-1})^d \qquad (\text{eq 2})$$

$$\text{with } d = \frac{c}{uv}.$$

This equality advantageously stems from a suitable choice of elements R1, R2, T1, T2 and of values a1 and a2, and also from the properties of the bilinear pairing e. Verifying this equality requires few resources, since it relies on a single exponentiation and on one multiplication.

Furthermore, verifying the equality (eq2) also makes it possible for the entity 2 to avoid performing the verification that the value a2 of the bilinear pairing supplied by the server 4 is an element of the group GT, since $(a1 \cdot s^{-1})^d$ is then necessarily an element of GT.

If the verification of the equality (eq2) is positive, then the entity 2 is convinced that the bilinear pairing value e(A,B) supplied by the calculation server 4 is correct. Otherwise, it rejects this result.

It can thus clearly be seen in this implementation that only one exponentiation in the group GT is required for making sure that the bilinear pairing value e(A,B) as calculated and transmitted by the calculation server 4 is valid.

With reference to FIG. 4, there follows a description of a third implementation of the invention.

This third implementation has a preferred application when the values A and B for which the entity 2 seeks to obtain a bilinear pairing value e(A,B) are secret, in other words are not to be disclosed to the calculation server 4. This third implementation thus makes it possible in this context not only to ensure that the pairing value e(A,B) supplied by the calculation server 4 is verifiable, but also to ensure that the values A, B and e(A,B) remain confidential.

More precisely, with reference to FIG. 4, the entity 2 selects two public elements P1 and P2, respectively from the groups G1 and G2, for which it knows a pairing value e(P1,P2) (step F10).

In similar manner to the first and second implementations, the pairing value e(P1,P2) may advantageously be precalculated for a predetermined set of values P1 and P2 (where P1 and P2 belong to groups of finite order $\underline{p}$), and the values as precalculated in this way are downloaded and stored in the chip 2A of the entity 2 while it is being created, so as to avoid the entity 2 needing to calculate the pairing value e(P1,P2).

Nevertheless, the invention is not limited to a static configuration of the entity 2 using values for e(P1,P2) that are precalculated before it is created. It is possible to envisage that new values of e(P1,P2) are downloaded to the entity 2 for other values P1 and P2 at later times (i.e. after its creation) using conventional means, these values potentially being calculated by entities that are distinct from the entity 2 (i.e. typically by more powerful calculation servers), e.g. using a delegation method of the invention.

The entity 2 also selects two random numbers $\underline{u}$ and $\underline{v}$ from the set of relative integers less than $\underline{p}$, and then determines a secret element S from the pairing value e(P1, P2) and the random numbers $\underline{u}$ and $\underline{v}$, as follows:

$$S = e(uP1, vP2) = [e(P1,P2)]^{uv}$$

The entity 2 selects two other elements S1 and S2 that it keeps secret from the calculation server 4, specifically: S1=A and S2=B.

Thereafter, it generates four elements R1, R2, T1, and T2 from the elements S1, S2, P1, P2, $\underline{u}$, and $\underline{v}$ satisfying (step F20):

$$R1 = vS1$$

$$R2 = uS2$$

$$T1 = uP1 + S1, \text{ and}$$

$$T2 = vP2 + S2$$

R1 and T1 being elements of G1, and R2 and T2 being elements of G2.

These elements may be constructed for example from points of elliptic curves in manner known to the person skilled in the art.

These four elements R1, R2, T1, and T2 are then transmitted by the entity 2 to the calculation server 4 via its communication means (step F30).

In the third implementation, on receiving these elements, the calculation server 4 calculates (step F40') one pairing value a1 together with an intermediate value a2, such that:

$$(a1) = e(T1,T2)[e(R1,P2)e(P1,R2)]^{-1}, \text{ and}$$

$$(a2)^c = e(R1,R2)$$

As mentioned above, it is possible for this purpose to use known algorithms for calculating bilinear pairings, such as in particular the Tate-Lichtenbaum algorithm when the pairing $\underline{e}$ is a Tate pairing.

The calculation server 4 transmits the values a1 and a2 as calculated in this way to the entity 2 (step F50).

The entity 2 obtains the bilinear pairing value e(A,B) from the value a1 by calculating a1·S$^{-1}$ (step F60), i.e.:

$$e(A,B) = a1 \cdot S^1$$

In other words, by using the values exchanged between the entity 2 and the calculation server 4 in accordance with the invention, the bilinear pairing value is masked by the secret element S and can be obtained by the entity 2 from the value a1 as calculated by the calculation server 4 while performing in operation that is not very complex (multiplication). This ensures firstly that the calculation server 4 calculates the pairing value (or at least a value that enables the entity 2 to extract the pairing value e(A,B) easily), and secondly that confidentiality is guaranteed for A, B, and e(A,B).

In the presently-described implementation, the entity 2 then verifies the validity of the value e(A,B) as supplied by the calculation server 4 (step F70).

For this purpose, it verifies that:

$$e(A, B) = a1 \cdot S^{-1} = (a2)^d \quad \text{(eq 3)}$$

$$\text{with } d = \frac{c}{uv}.$$

This equality advantageously stems from a suitable choice of elements R1, R2, T1, T2 and of values a1 and a2, and also from the properties of the bilinear pairing $\underline{e}$. Verifying this equality requires few resources, since it relies on one exponentiation and on one multiplication. This exponentiation is in addition to that calculated by the entity 2 in step F10 in order to determine the secret element S.

If the verification of the quality (eq3) is positive, then the entity 2 is convinced that the bilinear pairing value e(A,B) derived from the value a1 supplied by the calculation server 4 is correct. Otherwise, it rejects this result.

It can thus be seen that in this implementation, only two exponentiations in the group GT are required to ensure the validity and the confidentiality of the bilinear pairing value e(A,B) calculated and transmitted by the calculation server 4.

As in the first implementation, it should be observed that it is possible to envisage the calculation server 4 calculating and transmitting the following values:

$$a1 = e(T1,T2)[e(R1,P2)e(P1,R2)]^{-1}, \text{ and}$$

$$a2 = e(R1,R2)$$

in the steps F40 and F50. The equalities applied to the steps F60 and F70 then need to be modified in corresponding manner to enable the entity 2 to extract the bilinear pairing value e(A,B) from a2 and to verify that the extracted value is correct.

Furthermore, and as mentioned above for the first and second implementations, it is possible in the third implementation during a preliminary step to precalculate certain values that are independent of the secret values A and B (namely u, v, and S), and to store the values as precalculated in this way in a memory of the entity 2.

Thus, in its variant implementations, the invention proposes a protocol that makes it possible to ensure that the calculation delegated to the calculation server is verifiable. This invention has numerous applications in the field of telecommunications and in particular of cryptography. It can be used in particular to verify signatures issued while using the above-mentioned protocol proposed by Boneh, Lynn, and Shacham, or for encrypting digital data using the protocol proposed by Boneh and Franklin in the document entitled "Identity-based encryption from the Weil pairing", Advances in Cryptology—CRYPTO 2001, 21$^{st}$ Annual International Cryptology Conference, Santa Barbara, Calif., USA, Aug. 19-23, 2001, Proceedings, Springer, Lecture Notes in Computer Science, Volume 2139, pp. 213-229.

It should be observed that in all three embodiments described herein, the calculation server 4 is configured to calculate and supply to the entity 2 values a1 and a2 that in general terms satisfy:

$$(a1)^y = e(T1,T2)[e(R1,P2)e(P1,R2)]^{-1}, \text{ and}$$

$$(a2)^z = e(A,B) \text{ or } e(R1,R2)$$

where y and z designate two predetermined integers, each of these integers possibly being equal to 1 or to c. In order to improve the efficiency of the delegation method (and reduce the number of exponentiations performed by the entity 2), y and z may advantageously be selected in such a manner that:

$$y = c + 1 - z$$

The invention claimed is:

1. A delegation method enabling an entity to delegate calculation of a bilinear pairing value e(A,B) between two values A and B to a calculation server, said delegation method comprising:
   selecting, by said entity, two public elements P1 and P2 and two elements S1 and S2 that said entity keeps secret, two of the elements P1, P2, S1, and S2 being selected from among the values A and B respectively;
   generating, by said entity, four elements:

$$R1 = vS1$$

$$R2 = uS2$$

$$T1 = uP1 + S1, \text{ and}$$

$$T2 = vP2 + S2$$

where u and v designate random numbers;
   transmitting, by said entity, said elements R1, R2, T1, and T2 to said calculation server;
   calculation, by said calculation server, of two values a1 and a2 satisfying:

$$(a1)^y = e(T1,T2)[e(R1,P2)e(P1,R2)]^{-1}, \text{ and}$$

$$(a2)^z = e(D1,D2)$$

y and z designating two predetermined integers, each of said integers being equal to 1 or to a predetermined integer c, and D1 and D2 designating two public elements selected from among the values A and B or the elements R1 and R2;
   transmitting, by said calculation server, the values a1 and a2 to said entity; and obtaining, by said entity, said pairing value e(A,B) from the value a1 or from the value a2.

2. The delegation method of claim 1, further comprising verifying the validity of the extracted pairing value e(A,B) by using an equality relating the values a1 and a2, the random numbers u and v, and an element S that is kept secret by said entity.

3. The delegation method of claim 2, wherein the element S and the random numbers u and v are independent of the values A and B.

4. The delegation method of claim 2, wherein the element S is such that $S^y = e(S1,S2)$ or equal to e(uP1,vP2).

5. An obtaining method enabling an entity to obtaining a bilinear pairing value e(A,B) between two values A and B from a value calculated by a calculation server, said obtaining method comprising:
   selecting two public elements P1 and P2 and two elements S1 and S2 that said entity keeps secret, two of the elements P1, P2, S1, and S2 being selected from among the values A and B respectively;
   generating four elements:

$$R1 = vS1$$

$$R2 = uS2$$

$$T1 = uP1 + S1, \text{ and}$$

$$T2 = vP2 + S2$$

where u and v designate random numbers;
   transmitting said elements R1, R2, T1, and T2 to said calculation server;
   receiving two values a1 and a2 calculated by said calculation and satisfying:

$$(a1)^y = e(T1,T2)[e(R1,P2)e(P1,R2)]^{-1}, \text{ and}$$

$$(a2)^z = e(D1,D2)$$

y and z designating two predetermined integers, each of said integers being equal to 1 or to a predetermined integer c, and D1 and D2 designating two public elements selected from among the values A and B or the elements R1 and R2; and
   obtaining said pairing value e(A,B) from the value a1 or from the value a2.

6. A transmission method performed by a calculation server, said transmission method comprising:
   receiving from an entity four elements R1, R2, T1, and T2;
   calculating two values a1 and a2 satisfying:

$$(a1)^y = e(T1,T2)[e(R1,P2)e(P1,R2)]^{-1}, \text{ and}$$

$$(a2)^z = e(D1,D2)$$

wherein e(A,B) designates a bilinear pairing between two values A and B, P1 and P2 designate two public elements, y and z designate two predetermined integers, each of said integers being equal to 1 or to a predetermined integer c, and D1 and D2 designate two public elements selected from among two values A and B or from among the elements R1 and R2; and
   transmitting the values a1 to a2 to said entity to enable the entity to obtain the bilinear pairing value e(A,B) between the two values A and B.

7. The delegation method of claim 1, wherein the predetermined integers y and z satisfy:

$$z = c + 1 - y.$$

8. The delegation method of claim 1, wherein the values A and B are kept secret by said entity, and wherein:

$S1=A$, $S2=B$, and $y=1$, $z=c$ or $y=z=1$.

9. The delegation method of claim 1, wherein the values A and B are public values, and wherein:

$P1=A$, $P2=B$, and $y=c$, $z=1$ or $y=z=1$.

10. A computer having stored thereon a program comprising instructions for executing the obtaining method according to claim 5 when said program is executed by said computer.

11. A non-transitory computer readable data medium having stored thereon a computer program comprising instructions for executing the obtaining method according to claim 5.

12. An entity configured to obtain a bilinear pairing value $e(A,B)$ between two values A and B from a value calculated by a calculation server, said entity comprising:
- a selector configured to select two public elements P1 and P2 and two elements S1 and S2 that said entity keeps secret, two of the elements P1, P2, S1, and S2 being selected from among the values A and B respectively;
- a generator configured to generate four elements:

$R1=vS1$ $R2=uS2$ $T1=uP1+S1$, and $T2=vP2+S2$ where u and v designate random numbers;
- a transmitter configured to transmit said elements R1, R2, T1, and T2 to said calculation server;
- a receiver configured to receive two values a1 and a2 calculated by said calculation server and satisfying:

$(a1)^y=e(T1,T2)[e(R1,P2)e(P1,R2)]^{-1}$, and $(a2)^z=e(D1,D2)$ y and z designating two predetermined integers, each of said integers being equal to 1 or to a predetermined integer c, and D1 and D2 designating two public elements selected from among the values A and B or the elements R1 and R2; and
- an obtainer configured to obtain said pairing value $e(A,B)$ from the value a1 or from the value a2.

13. A calculation server comprising:
- a receiver configured to receive from an entity four elements R1, R2, T1, and T2;
- a calculator configured to calculate two values a1 and a2 satisfying:

$(a1)^y=e(T1,T2)[e(R1,P2)e(P1,R2)]^{-1}$, and $(a2)^z=e(D1,D2)$ e designating a bilinear pairing, P1 and P2 designating two public elements, y and z designating two predetermined integers, each of said integers being equal to 1 or to a predetermined integer c, and D1 and D2 designating two public elements selected from among the values A and B or from among the elements R1 and R2; and
- a transmitter configured to transmit the values a1 to a2 to said entity.

14. A system comprising:
- an entity according to claim 12; and
- a calculation server, said calculation server comprising:
- a receiver configured to receive from an entity-four elements R1, R2, T1, and T2;
- a calculator configured to calculate two values a1 and a2 satisfying:

$(a1)^y=e(T1,T2)[e(R1,P2)e(P1,R2)]^{-1}$, and $(a2)^z=e(D1,D2)$ e designating a bilinear pairing, P1 and P2 designating two public elements, y and z designating two predetermined integers, each of said integers being equal to 1 or to a predetermined integer c, and D1 and D2 designating two public elements selected from among the values A and B or from among the elements R1 and R2; and
- a transmitter configured to transmit the values a1 to a2 to said entity;
- wherein said entity is configured to delegate to said calculation server a calculation of a bilinear pairing value $e(A,B)$ between two values A and B.

15. A computer having stored thereon a program comprising instructions for executing the transmission method according to claim 6 when said program is executed by said computer.

16. A non-transitory computer readable data medium having stored thereon a computer program comprising instructions for executing the transmission method according to claim 6.

* * * * *